Figure 1:
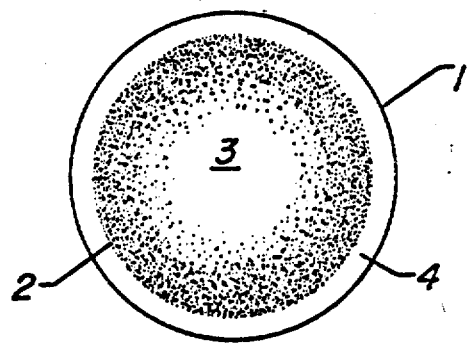

United States Patent [19]

Lester

[11] 3,931,054

[45] Jan. 6, 1976

[54] METHOD OF CATALYST MANUFACTURE
[75] Inventor: George R. Lester, Park Ridge, Ill.
[73] Assignee: Universal Oil Products Company, Des Plaines, Ill.
[22] Filed: Apr. 19, 1974
[21] Appl. No.: 462,470

[52] U.S. Cl......... 252/466 PT; 252/466 J; 252/472; 423/213.5
[51] Int. Cl.² ...................... B01J 23/56; B01J 23/74; B01J 21/04
[58] Field of Search ........... 252/460, 466 PT, 466 J, 252/472; 423/213.5

[56] References Cited
UNITED STATES PATENTS 3,259,454   7/1966   Michalko .................. 423/213.5
3,367,888   2/1968   Hoekstra .................. 252/456 X Primary Examiner—W. J. Shine
Attorney, Agent, or Firm—James R. Hoatson, Jr.; Robert W. Welch; William H. Page, II

[57] ABSTRACT

A method of impregnating a catalytic component as a subsurface layer on a carrier material. The carrier material is immersed in an impregnating solution containing a catalytic component and a dibasic carboxylic acid, with a sulfur-containing carboxylic acid being subsequently added to the solution whereby the catalytic component is dispersed in a subsurface layer on the carrier material and penetration beyond the desired subsurface layer is substantially obviated.

9 Claims, No Drawings

METHOD OF CATALYST MANUFACTURE

Gaseous waste products resulting from the burning or combustion of hydrocarbonaceous fuels, such as gasoline and fuel oils, comprise hydrocarbons, carbon monoxide and oxides of nitrogen as products of combustion or incomplete combustion and, when discharged directly to the atmosphere, pose a serious health problem. While exhaust gases from other hydrocarbonaceous fuel burning sources such as stationary engines, industrial furnaces, and the like, contribute substantially to air pollution, the exhaust gases of automobile engines are a principal source of pollution. In recent years, with the ever growing number of automobiles powered by internal combustion engines, the discharge of waste products therefrom has been of increasing concern, particularly in urban areas, and the control thereof has become exceedingly important. Of the various methods which have been proposed for reducing the hydrocarbons, carbon monoxide and nitrogen oxides emissions, the incorporation of a catalytic converter in the exhaust system holes the most promise of meeting the increasingly rigid standards set by responsible governmental agencies.

It has heretofore been shown that a catalytically active component embedded as a subsurface layer on a support or carrier material provides a particularly useful catalyst for the conversion of hydrocarbons, carbon monoxide and nitrogen oxide contained in hot exhaust gases emanating from an internal combustion engine. For example, see U.S. Pat. No. 3,259,454 which provides a method of impregnating a catalytic component on a carrier material as a subsurface layer a finite distance from the exterior surface and a finite distance from the center thereof. Briefly, the method comprises commingling a dibasic carboxylic acid, such as citric acid, with a catalytic component in an impregnating solution whereby said component is deposited as a subsurface layer on a carrier material subsequently impregnated with said solution. In addition to the improved conversion of noxious components of exhaust gases, deposition of the catalytic component on the carrier material as a subsurface layer substantially obviates poisoning of said component and the loss thereof which typically occurs by reason of the abrasion and attrition of surface-impregnated catalyst particles.

Subsequent experience has shown that while substantially all of the catalytic component is embedded as a subsurface layer a finite distance from the exterior surface and a finite distance from the center of the carrier material, a significant amount of the frequently expensive catalytic component will invariably penetrate beyond the desired subsurface layer out of effective contact with a reactant stream.

It is therefore an object of this invention to present a novel method of impregnating a catalytic component as a subsurface layer on a refractory inorganic oxide carrier material, which method precludes the penetration of said catalytic component beyond said subsurface layer.

In one of its broad aspects, the present invention embodies a method of manufacturing a catalytic composite which comprises commingling a refractory inorganic oxide carrier material in an impregnating solution with a Group VIII metal compound and from about 0.05 to about 0.75 wt. % dibasic carboxylic acid; maintaining said carrier material in said solution for a period of from about 2 to about 10 minutes, and then commingling from about 0.1 to about 1.5 wt. % sulfur-containing carboxylic acid with said solution, based on the weight of said carrier material, and effecting the deposition of said Group VIII metal compound concentrated in a thin subsurface layer on the carrier material; thereafter washing, drying and calcining the impregnated carrier material.

Other objects and embodiments of this invention will become apparent in the following detailed specification.

In accordance with the method of this invention, a refractory inorganic oxide support or carrier material is initially commingled in an impregnating solution with a Group VIII metal compound and a dibasic carboxylic acid. The refractory inorganic oxides may be naturally occurring materials, for example clays and silicates such as fuller's earth, Attapulgus clay, feldspar, halloysite, montmorillonite, kaolin, and diatomaceous earth, frequently referred to as siliceous earth, diatomaceous silicate, kieselguhr, and the like, and the naturally occurring materials may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia, and the like are especially suitable. In some cases, the refractory inorganic oxide support or carrier material may also exhibit a catalytic effect alone or in combination with other components of the catalytic composite. Alumina is a preferred refractory inorganic oxide, and the alumina may be any of the various hydrous aluminum oxides or alumina gels including alphaalumina monohydrate (boehmite), alpha-alumina trihydrate (gibbsite), betaalumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 25 to about 600 and more specifically from about 100 to about 500 square meters per gram, especially gamma-alumina and eta-alumina resulting from the thermal treatment of boehmite alumina and bayerite alumina respectively, generally at a temperature of from about 400° to about 850° C. The alumina may be employed in any suitable shape or form including spheres, pills, extrudates, granules, cakes, briquettes, rings, etc., and particularly low density spheres such as are continuously manufactured by the oil-drop method described in detail in U.S. Pat. No. 2,620,314.

As heretofore stated, the refractory inorganic oxide support or carrier material is commingled with an impregnating solution of a Group VIII metal compound and a dibasic carboxylic acid — the dibasic carboxylic acid effecting impegnation of the Group VIII metal compound on the support or carrier material as a subsurface layer a finite distance from the surface thereof and a finite distance from the center. Suitable Group VIII metal compounds, that is, compounds of iron, nickel, cobalt, platinum, palladium, ruthenium, rhodium, osmium and iridium, include nickel nitrate, nickel sulfate, nickel chloride, nickel acetate, nickel formate, cobaltous nitrate, cobaltous sulfate, ferric chloride, ferric nitrate, ferric sulfate, chloroplatinic acid, platinum tetrachloride, ammonium chloroplatinate, dinitrodiamino platinum, palladium chloride, chloropalladic acid, rhodium trichloride, ruthenium tetrachloride, osmium trichloride, iridium trichloride, and the like.

Of the Group VIII metals, the noble or platinum group metals are preferred. While platinum per se has long been known to catalyze the oxidation of noxious exhaust gases to effect substantially complete conversion of the combustible pollutants contained therein, it has now been found that the required amount of the relatively expensive platinum can be substantially reduced utilizing a palladium promoter, and it has been further found that substantially less total noble metals, palladium and platinum, is required to obtain substantially complete conversion than is the case with platinum alone. The total noble metals concentration and the palladium/platinum weight ratio for a given concentration are factors which exert a strong influence on the activity stability of the catalytic composite of this invention. The activity stability of a catalytic composite containing from about 0.0025 to about 2.0 wt. % or more total noble metals is improved utilizing a palladium/platinum weight ratio in the range of from about 9:1 to about 1:4. In any case, the total noble metals in the range of from about 0.0025 to about 2.0 wt. % or more, utilizing a palladium/platinum weight ratio of from about 9:1 to about 1:4, is appreciably less than would otherwise be required of platinum alone to achieve an equivalent conversion. A total noble metals concentration in the lower range, say from about 0.0025 to about 1.0 wt. % is particularly effective in combination with a palladium/platinum weight ratio of from about 2:1 to about 4:1.

Prior associated work, as exemplified by U.S. Pat. No. 3,259,589, has shown the improved conversion of exhaust gases through the use of an impregnating agent to position the Group VIII metal component a finite distance below the surface of the carrier material. The impregnating agent is a dibasic carboxylic acid having the following structural formula:

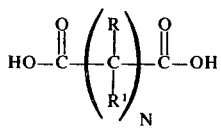

where:
R is selected from hydrogen, hydroxyl and alkyl groups;
R¹ is selected from hydrogen, alkyl and carboxyl groups; and
n is within the range of 0–6 Examples of the dibasic carboxylic acids are oxalic, malonic, succinic, glutaric, adipic, pimelic, suberic, malic, tartaric, citric, and the like. The amount of dibasic carboxylic acid, preferably citric acid, employed in the impregnating solution is determined by the weight of the carrier material impregnated. The amount is suitably in the range of from about 0.05 to about 0.75 wt. % of said carrier material.

As heretofore mentioned, it has been observed that although the inclusion of a dibasic carboxylic acid in the impregnating solution is effective to deposit a catalytic component embedded as a subsurface layer a finite distance from the exterior surface of a support or carrier material, a significant amount of the frequently expensive catalytic component will invariably migrate and penetrate beyond the desired subsurface layer during the impregnation process. While U.S. Pat. No. 3,367,888 describes the use of a sulfur-containing carboxylic acid to impregnate a catalytic component on the extreme outer surface of a support or carrier material, it has now been discovered that the subsequent and timely addition of said sulfur-containing carboxylic acid to the above-described impregnating solution in contact with the support or carrier material, as herein practiced, will effectively arrest the migration of the catalytic component and limit its penetration beyond the desired subsurface layer during the impregnation process.

Accordingly, pursuant to the method of this invention, the support or carrier material is maintained in the dibasic carboxylic acidcontaining impregnating solution for a period of from about 2 to about 10 minutes after which a sulfur-containing carboxylic acid is added thereto. The sulfur-containing carboxylic acid is substantially as described in U.S. Pat. No. 3,367,888, that is, preferably a thio or mercapto carboxylic acid such as, for example, thiomalic acid, thioglycolic acid, mercaptopropionic acid, and the like. The quantity to be employed is generally based on the weight of the carrier material, and is suitably from about 0.1 to about 1.5 wt. % thereof.

The method of this invention can be effected utilizing impregnating techniques known to the art. Thus, a particulate carrier material can be immersed in a common aqueous solution of chloroplatinic acid and chloropalladic acid or palladium chloride, said solution further containing a selected dibasic carboxylic acid, preferably citric acid, in the requisite amount. The selected sulfur-containing carboxylic acid, preferably thiomalic acid, is added to the solution within from about 2 to about 10 minutes of the carrier material, and the solution thereafter evaporated to dryness in contact with the carrier material. For example, a given volume of 1/16–⅛inch alumina spheres is immersed in a substantially equal volume of an impregnating solution in a steam-jacketed rotary dryer — the impregnating solution comprising chloroplatinic acid, chloropalladic acid and a requisite quantity of citric acid. The spheres are tumbled in the impregnating solution for a period of from about 2 to about 10 minutes after which thiomalic acid is added thereto. Steam is subsequently applied to the dryer jacket to expedite evaporation of the solution and recovery of substantially dry impregnated alumina spheres. The resulting composite is subsequently heat treated at a temperature of from about 200° to about 1000°C. or more and preferably from about 315° to about 925° C. for a period of from about ½ to about 2 hours or more, preferably in a reducing atmosphere such as hydrogen. Sulfidation, by treating the catalyst composite in contact with hydrogen sulfide at ambient temperature, has in some cases been shown to be of advantage.

There are a number of factors which effect the activity, activity stability and physical stability of a catalytic composite, and the factors are generally peculiar to the environment in which the catalytic composite functions. For example, the automotive internal combustion engine is commonly operated over a wide range of speed and load conditions including idling, cruising, accelerating and decelerating conditions, and the combustion efficiency varies accordingly. Consequently, the environment in which the catalytic composite must function will comprise not only variations in the concentration of pollutants at any given time, but also variations in temperature and space velocity at any given time. Thus, in the treatment of noxious exhaust gases from an internal combustion engine, the catalytic composite must function in an environment of changing gaseous hourly space velocities in the range of from about 10,000 to about 100,000 or more, and temperature variations of from about 95° to about 1100° C. or more, and must exhibit high activity and physical strength over an extended period equivalent to about 50,000 miles or more of automotive operation.

While the particular refractory inorganic oxides herein contemplated are generally useful as a catalyst support or carrier material, and exceptionally resistant to physical degradation in a more conventional type of operation, they experience a shrinkage upon continued exposure to the extreme temperatures encountered in the treatment of exhaust gases from an internal combustion engine resulting in breakage and loss of catalyst. This is particularly so with respect to the more desirable low density refractory inorganic oxides. The catalytic composite of this invention preferably includes an alkaline earth component selected from the group consisting of barium, strontium and calcium to improve the activity and activity stability of the catalytic components, and especially the physical stability of the refractory inorganic oxide support or carrier material on which the physical stability of the catalytic composite depends. Of the alkaline earth components, barium is preferred. The optimum alkaline earth component is a function of the density of the refractory inorganic oxide employed as a support or carrier material. It will be appreciated that refractory inorganic oxides of higher density suffer less shrinkage at higher temperatures than do those of lower density, and the optimum alkaline earth content will therefore increase in the range of from about 1 to about 20 wt. % with decreasing density. Preferably, the refractory inorganic oxide is alumina characterized by an average bulk density of from about 0.3 to about 0.5 grams/cubic centimeter, and the alkaline earth content, preferably barium, is in the range of from about 3 to about 10 wt. %.

The alkaline earth component may be added to the catalytic composite prior to, concurrently with, or subsequent to the catalytic component. In some cases, the addition sequence may provide an improved catalytic composite for a particular use. For example, in the conversion of noxious exhaust gases, it has been observed that the initial activity of the catalytic composite is improved when the alkaline earth component is added subsequent to the noble metals component. However, it is not intended to limit this invention to any particular sequence of alkaline earth and noble metals addition. The alkaline earth component is suitably added to the catalytic composite by the method whereby a soluble compound of the desired alkaline earth component is impregnated on the support or carrier material from an aqueous solution. The soluble compound serves as a precursor of the desired component such that, upon subsequent heating of the impregnated support or carrier material at temperatures effecting decomposition of said compound, the desired component is formed deposited on the support or carrier material. The aqueous impregnating solution will thus comprise a soluble alkaline earth compound such as barium hydroxide, barium nitrate, barium chloride, barium sulfide, barium formate, barium acetate, barium chloroplatinate, calcium hydroxide, calcium nitrate, calcium chloride, calcium sulfide, calcium formate, calcium acetate, strontium hydroxide, strontium nitrate, strontium chloride, strontium sulfide, strontium formate, strontium acetate, and the like.

The carrier material, with or without the noble metals component added thereto, is suitably impregnated by immersing the carrier material in a solution of the selected alkaline earth compound, maintaining the carrier material in contact with the solution at quiescent conditions and at ambient temperature for a brief period, preferably at least about 30 minutes, and thereafter evaporating the solution to dryness in contact with the carrier material. The dried composite is subsequently calcined, preferably in air, at a temperature of from about 315° to about 925° C. for a period of from about 2 to about 4 hours.

The following example is presented in illustration of a preferred embodiment of this invention and is not intended as an undue limitation on the generally broad scope of the invention as set out in the appended claims.

EXAMPLE

In the preparation of a catalyst in accordance with the method of this invention, 200 grams of ⅛ inch gamma-alumina spheres having an average bulk density of about 0.3 grams per cubic centimeter and a surface area of about 180 square meters per gram were immersed in 600 milliliters of impregnating solution contained in a steam-jacketed rotary dryer. The impregnating solution contained 0.018 grams of platinum (as chloroplatinic acid) and 0.075 grams of palladium (as palladium chloride), and further contained 0.150 grams of citric acid monohydrate. The alumina spheres were tumbled in the solution for about 8 minutes after which 0.36 grams of thiomalic acid was added thereto. Steam was thereafter applied to the dryer jacket and the solution was evaporated to dryness in contact with the tumbling spheres. The impregnated spheres were heated at about 535° C. for two hours in a hydrogen atmosphere and thereafter cooled to room temperature under nitrogen. The spheres were next immerged and soaked for about 90 minutes in a warm, stirred, 800 milliliter solution of 40 grams of barium oxide in water, water-washed and oven-dried at about 120° C. The dried spheres were subjected to a final reduction in hydrogen in the manner last described.

Another catalyst was prepared substantially as described except that the thiomalic treatment was omitted.

Figure 2:
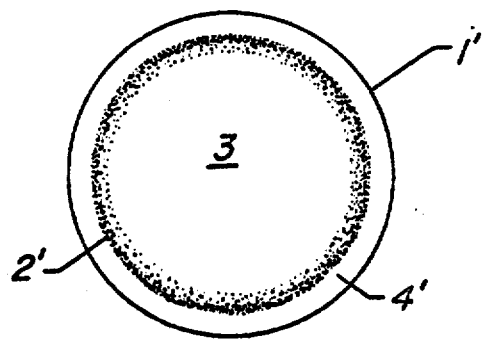

The attached drawing represents a cross-sectional view of an average catalyst particle prepared by each of the described methods. FIG. 1 is illustrative of the catalyst particles produced by the prior art method utilizing citric acid in the impregnating solution, and FIG. 2 is illustrative of the catalyst particles produced by the method of this invention. In FIG. 1, the numeral 1 indicates the exterior surface of the sphere, and the totally embedded continuous layer of the platinum-palladium component is shown by the numeral 2. An inner core of alumina, virtually free of the platinum-palladium component but with some penetration of the outer fringe area, is indicated by the number 3. A numeral 4 depicts an outer band of alumina also virtually free of the platinum-palladium component. In the comparison, FIG. 2 shows an inner core of alumina, number 3', which is virtually free of the platinum-palladium component, including the outer fringe area thereof. The limited penetration results in a greater concentration of the platinum-palladium component in the subsurface layer 2'. The numeral 1' indicates the exterior surface of the sphere, and the numeral 4' indicates the outer band of alumina virtually free of the platinum-palladium component.

I claim as my invention:

1. A method of manufacturing a catalytic composite which comprises:

(a) commingling a refractory inorganic oxide carrier material in an impregnating solution with a metal component selected from the group consisting of iron group metal salt, noble metal salt and noble metal acid and from about 0.05 to about 0.75 wt. % dibasic carboxylic acid having the following structural formula:

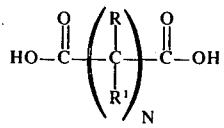

where:
R is selected from hydrogen, hydroxyl and alkyl groups;
R¹ is selected from hydrogen, alkyl and carboxyl groups; and
n is within the range of 0–6 b. maintaining said carrier material in said solution for a period of from about 2 to about 10 minutes, thereafter commingling from about 0.1 to about 1.5 wt. % sulfur-containing carboxylic acid with said solution, based on the weight of said carrier material, said sulfur-containing acid being selected from the group consisting of thiomalic, thioglycolic and mercaptopropionic acids, and effecting the deposition of said metal component concentrated in a thin subsurface layer on the carrier material;

c. thereafter washing, drying and calcining the impregnated carrier material.

2. The method of claim 1 further characterized in that said dibasic carboxylic acid is citric acid.

3. The method of claim 1 further characterized in that said sulfur-containing carboxylic acid is thiomalic acid.

4. The method of claim 1 further characterized in that said metal component is a noble metal salt or noble metal acid.

5. The method of claim 1 further characterized in that said metal component is a platinum salt or platinum acid.

6. The method of claim 1 further characterized in that said metal component is a platinum salt or platinum acid in combination with a palladium salt or palladium acid.

7. The method of claim 1 further characterized in that said metal component comprises palladium salt or palladium acid in combination with platinum in a weight ratio of from about 9:1 to about 1:4, in an amount to yield a final catalytic composite containing from about 0.0025 to about 2.0 wt. % of the palladium-platinum combination.

8. The method of claim 1 further characterized in that said refractory inorganic oxide carrier material is a low density, spheroidal alumina with a surface area of from about 25 to about 600 square meters per gram.

9. The method of claim 1 further characterized in that said impregnated carrier material is dried and calcined at a temperature of from about 200° to about 1000° C. or more.

* * * * *

UNITED STATES PATENT AND TRADEMARK OFFICE
CERTIFICATE OF CORRECTION

PATENT NO. : 3,931,054

DATED : January 6, 1976

INVENTOR(S) : George R. Lester

It is certified that error appears in the above—identified patent and that said Letters Patent is hereby corrected as shown below:

The attached sheet of drawing consisting of Figures 1 and 2 should be inserted as the sole sheet of drawing to the above-identified patent.

On the title page, below the Abstract, "No Drawings" should read -- 2 Drawing Figures --.

*Signed and Sealed this*

*Eighth* Day of *January 1980*

[SEAL]

*Attest:*

*Attesting Officer*

SIDNEY A. DIAMOND

*Commissioner of Patents and Trademarks*